United States Patent
Mauder et al.

(10) Patent No.: US 9,621,069 B2
(45) Date of Patent: Apr. 11, 2017

(54) RECTIFIER WITH VOLTAGE DETECTION AND CONTROLLABLE OUTPUT PATH

(71) Applicant: Infineon Technologies Austria AG, Villach (AT)

(72) Inventors: Anton Mauder, Kolbermoor (DE); Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 61 days.

(21) Appl. No.: 14/456,346

(22) Filed: Aug. 11, 2014

(65) Prior Publication Data

US 2016/0043657 A1 Feb. 11, 2016

(51) Int. Cl.
| | |
|---|---|
| H02M 7/217 | (2006.01) |
| H02M 1/08 | (2006.01) |
| H02M 1/32 | (2007.01) |
| H02M 1/36 | (2007.01) |
| H02M 1/42 | (2007.01) |
| H02M 7/219 | (2006.01) |
| H02M 1/00 | (2006.01) |

(52) U.S. Cl.
CPC ............ *H02M 7/217* (2013.01); *H02M 1/083* (2013.01); *H02M 1/32* (2013.01); *H02M 1/36* (2013.01); *H02M 1/4225* (2013.01); *H02M 7/219* (2013.01); *H02M 2001/0006* (2013.01); *H02M 2001/0032* (2013.01); *H02M 2007/2195* (2013.01); *Y02B 70/126* (2013.01); *Y02B 70/1408* (2013.01); *Y02B 70/16* (2013.01)

(58) Field of Classification Search
CPC ........ H02M 7/217; H02M 7/12; H02M 7/155; H02M 7/1555; H02M 7/162; H02M 7/1623; H02M 7/1626; H02M 7/21; H02M 7/219; H02M 7/1557
See application file for complete search history.

(56) References Cited

U.S. PATENT DOCUMENTS

| | | | | |
|---|---|---|---|---|
| 4,777,580 A | | 10/1988 | Bingham | |
| 4,811,191 A | | 3/1989 | Miller | |
| 4,819,147 A | | 4/1989 | Bingham | |
| 5,398,182 A | * | 3/1995 | Crosby | ..................... G05F 1/66 307/71 |
| 6,134,130 A | * | 10/2000 | Connell | ............. G06K 19/0701 363/70 |

(Continued)

*Primary Examiner* — Harry Behm
*Assistant Examiner* — Peter Novak
(74) *Attorney, Agent, or Firm* — Murphy, Bilak & Homiller, PLLC

(57) ABSTRACT

The rectifier includes two input paths configured to receive an alternating input voltage and two output paths configured to provide a direct output voltage. A switched-mode rectifying path is connected between one of the input paths and one of the output paths and comprises at least two semiconductor elements with controllable paths; the controllable paths are series-connected with each other. An auxiliary output node is disposed between the controllable paths of the two semiconductor elements in the rectifying path and provides an auxiliary node voltage. A controllable output path is connected downstream of one of the two output paths and comprises a semiconductor element with a controllable path, wherein the controllable path of the semiconductor element of the controllable output path is controlled by a signal representing the auxiliary node voltage.

28 Claims, 7 Drawing Sheets

(56) References Cited

U.S. PATENT DOCUMENTS

2009/0257259 A1  10/2009  Leibovitz
2011/0044081 A1   2/2011  Lu
2013/0154492 A1   6/2013  Summerland

* cited by examiner

RECTIFIER WITH VOLTAGE DETECTION AND CONTROLLABLE OUTPUT PATH

TECHNICAL FIELD

The present disclosure relates to full-wave rectifiers, in particular to bridge rectifiers.

BACKGROUND

A bridge rectifier is a type of electrical circuit in which four rectifying paths are connected between each of two alternating current (AC) input paths and each of two direct current (DC) output paths to provide the same polarity of output for either polarity of input (half wave). The rectifying paths usually include one or more diodes, which are quite inefficient and considerably affect the overall efficiency of power conversion from AC energy to DC energy. The inefficiency arises from the forward voltages of the diodes, which may be up to 1 volt or more. As at least two diodes are connected in series at any time during operation of a bridge rectifier, the voltage loss caused by the diodes may approximately be between 1.4 and 2 volts (V) in common power supply circuits with an input voltage approximately between 85 and 265 volts. In various applications, bridge rectifiers are connected upstream of further supply voltage processing circuitry such as power factor controllers, active filters or voltage regulators. Due to the nature of AC and the behavior of bridge rectifiers, the power supplied to the subsequent supply voltage processing circuitry may be unstable and vary within the input voltage range.

In order to decouple an electronic load from the voltage protection circuitry, an energy storing element like a capacitor may be used. When power is switched on (or off), unwanted artifacts like voltage and/or current peaks in the output voltage of the supply of the voltage processing circuitry may occur during transients or in an early stage. The maximum, instantaneous input current drawn by an electrical device when first turned on is commonly referred to as inrush current, input surge current or switch-on surge. Power converters often have inrush currents much higher than their steady state currents, due to the charging current of the input capacitance. The selection of overcurrent protection devices such as fuses and circuit breakers is made more complicated when high inrush currents must be tolerated. The overcurrent protection must react quickly to overload or short circuit but must not interrupt the circuit when the inrush current flows. In certain cases, this necessitates additional measures to limit the inrush currents, e.g., series resistors, which cause additional losses.

SUMMARY

According to an embodiment, a rectifier includes two input paths configured to receive an alternating input voltage and two output paths configured to provide a direct output voltage. A switched-mode rectifying path is connected between one of the input paths and one of the output paths and includes at least two semiconductor elements with controllable paths. The controllable paths are series-connected with each other. An auxiliary output node is disposed between the controllable paths of the two semiconductor elements in the rectifying path and provides an auxiliary node voltage. A controllable output path is connected downstream of one of the two output paths and includes a semiconductor element with a controllable path, wherein the controllable path of the semiconductor element of the controllable output path is controlled by a signal representing the auxiliary node voltage.

According to another embodiment, a rectifier includes first and second input paths configured to receive an alternating input voltage, and first and second output paths configured to provide an output voltage from the alternating input voltage. Four rectifying paths are connected between the input paths and the output paths, the rectifying paths being configured to connect the first input path to the second output path and the second input path to the second output path during one half wave of the input voltage, and to connect the first input path to the second output path and the second input path to the first output path during the other half wave of the input voltage. At least two rectifying paths are switched-mode rectifying paths that include at least two semiconductor elements with controllable paths, the controllable paths being series-connected with each other. Two auxiliary output nodes are disposed between the controllable paths of two semiconductor elements in the switched-mode rectifying paths and provide auxiliary node voltages corresponding to the alternating input voltage, the auxiliary node voltages being referenced to the first output path or the second output path. A controllable output path is connected downstream of one of the two output paths and includes a semiconductor element with a controllable path. A switch control circuit is supplied with the auxiliary node voltage and connected to the semiconductor element in the controllable output path, wherein the switch control circuit is configured to detect at least one event and to control the controllable path of the semiconductor element in the controlled output path dependent on the detected event.

BRIEF DESCRIPTION OF THE DRAWINGS

These and other aspects are illustrated in the drawings, in which like referenced numerals designate corresponding parts throughout the different views. In the figures, like reference signs designate corresponding parts throughout the different views.

DETAILED DESCRIPTION

For the sake of simplicity, all transistors used in the exemplary two-wire full-wave rectifiers described below are metal-oxide-semiconductor field-effect transistors. Alternatively, these transistors may be bipolar transistors, junction field-effect transistors, silicon carbide transistors, gallium nitride transistors, or any other appropriate transistors.

Figure 1:
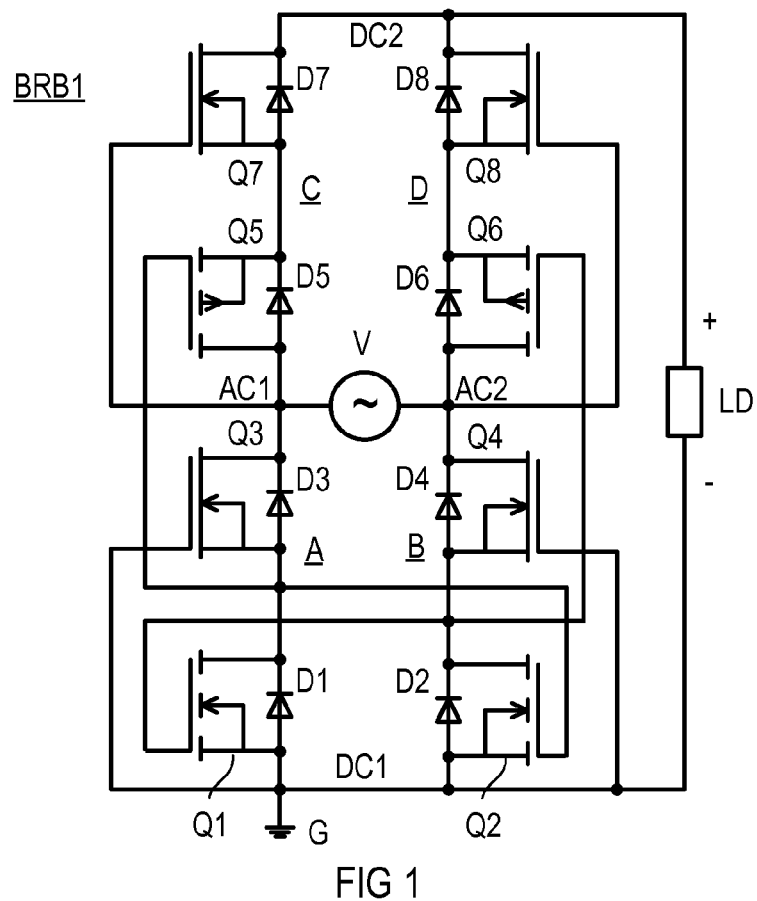
FIG. 1 is a circuit diagram of a full-wave rectifier with two transistors in each rectifying path.

As shown in FIG. 1, an exemplary bridge rectifier BRB1 includes four rectifying paths A, B, C and D, which are connected between each of two AC input paths AC1 and AC2 (connected to an AC source V) and each of two DC output paths DC1 and DC2 (connected to load L). In particular, rectifying path A is connected between input path AC1 and output path DC1, rectifying path B is connected between input path AC2 and output path DC1, rectifying path C is connected between input path AC1 and output path DC2 and rectifying path D is connected between input path AC2 and output path DC2. Output path DC1 in the circuit of FIG. 1 may be connected to ground G. Each of the four rectifying paths A, B, C and D includes a controllable switch, which may be provided by a cascode circuit of a normally-on transistor and a normally-off transistor. A cascode circuit is basically a two-stage amplifier composed of a transconductance amplifier followed by a current buffer. It can be constructed from two series-connected transistors, with one operating as a common source (or a common emitter) and the other as a common gate (or a common base).

The cascode circuits may employ transistors of a single conductivity type (i.e., p-channel or n-channel field-effect transistors) or transistors of different conductivity types (i.e., p-channel and n-channel field-effect transistors). In the bridge rectifier shown in FIG. 1, rectifying paths A and B include only n-channel field-effect transistors, while rectifying paths C and D include both n-channel and p-channel transistors. In particular, rectifying paths A and B may be identically constructed and may include a normally-off n-channel field-effect transistor Q1 or Q2, whose source line is connected to output path DC1 and whose gate line is connected to the drain line of the respective other transistor Q2 or Q1 (common-gate stage of a cascode circuit). In rectifying path A, the drain line of transistor Q1 is connected to the source line of a normally-on n-channel field-effect transistor Q3, whose gate is coupled to output path DC1 and whose drain line is connected to input path AC1 (common-source stage of a cascode circuit). Accordingly, in rectifying path B, the drain line of transistor Q2 is connected to the source line of a normally-on n-channel field-effect transistor Q4, whose gate is coupled to output path DC1 and whose drain line is connected to input path AC2.

Rectifying paths C and D may also be identically constructed. Rectifying path C may include a normally-off p-channel field-effect transistor Q5, whose drain line is connected to input path AC1 (common-drain stage) and whose gate line is connected to the drain line of transistor Q1 in rectifying path A. A normally-off n-channel field-effect transistor Q7 is connected via its source line to the source line of transistor Q5, via its gate line to input path AC1 and via its drain line to output path DC2 (common-gate stage). Rectifying path D may include a normally-off p-channel field-effect transistor Q6, whose drain line is connected to input path AC2 and whose gate line is connected to the drain line of transistor Q2 in rectifying path B. A normally-on n-channel field-effect transistor Q8 is connected via its source line to the source line of transistor Q6, via its gate line to input path AC2 and via its drain line to output path DC2.

Transistors Q1-Q8 may include internal diode-like structures, referred to as body diodes D1-D8, between respective source lines and drain lines of transistors Q1-Q8, whereby in n-channel transistors Q1-Q4, Q7 and Q8, the anodes of the diode-like structures are coupled to the source lines and the cathodes are coupled to the drain lines. In p-channel transistors Q5 and Q6, the cathodes of body diodes D5 and D6 are coupled to the source lines and their anodes are coupled to the drain lines.

When alternating voltage source V provides a voltage with a positive polarity on input line AC1 and a negative polarity on input line AC2, the potential at the source of transistor Q2 (i.e., in output path DC1) is theoretically more positive than that in input path AC2 by approximately the sum of the forward voltages of body diodes D2 and D4. As transistor Q4 is a normally-on transistor, the actual difference of the potentials may only be around the same value as the forward voltage of body diode D2. The voltage occurring between the source line and drain line of transistor Q2 is rather low so that transistor Q1 receives no relevant gate source voltage and therefore blocks. The voltage between input paths AC1 and AC2 is nearly the same as the voltage between the drain line of normally-on transistor Q3 and the source line of normally-off transistor Q1. In this operating state, both the normally-off transistor Q1 and the normally-on transistor Q3 block and thus divide the voltage between the first input path AC1 and the first output path DC1 at the node between their drain and source lines. The voltage at the drain line of normally-off transistor Q1 also appears between the gate line and source line of normally-off transistor Q2 so that this transistor and the series-connected normally-on transistor Q4 are in a conducting state. In this operating state, the body diodes D2 and D4 are bridged by the conducting drain-source paths of transistors Q2 and Q4, respectively. A current flowing through load LD via the first output path DC1 and the input path AC2 may cause a voltage drop between the first output path DC1 and the input path AC2 which is defined by the parallel connection of the body diodes D2 and D4 with the channels of transistors Q2 and Q4, which have ohmic characteristics. The voltage occurring between the drain line and source line of normally-on transistor Q3 is applied inversely to the gate-source path of the normally-off p-channel transistor Q5, which is thus in a conducting state. When normally-off, transistor Q5 is conducting and the series-connected normally-on transistor Q7 is also conducting.

On the other hand, in its conducting state, normally-on transistor Q4 causes the gate voltage of normally-off p-channel transistor Q6 to be low and thus causes transistor Q6 and corresponding series-connected normally-on transistor Q8 to block. Transistors Q6 and Q8 block synchronously with transistors Q1 and Q3 so that the corresponding rectifying paths A and D isolate output paths DC1 and DC2 from input paths AC1 and AC2. In contrast, rectifying paths B and C, which include transistors Q5, Q7, Q2 and Q4, are in an ohmic conducting state so that output paths DC1 and DC2 are switched to paths AC1 and AC2 with only little voltage loss.

When alternating voltage source V provides a voltage with a negative polarity on input line AC1 and a positive polarity on input line AC2, transistors Q2, Q4, Q5 and Q7 (and so the corresponding rectifying paths B and C) are in a blocking state, while transistors Q1, Q3, Q6 and Q8 (and so the corresponding rectifying paths A and D) are in an ohmic conducting state.

In the four-wave rectifier BRB1 shown in FIG. 1, the drain-source voltage of each transistor directly controls the gate of another transistor. Therefore, all transistors used here may be low-voltage transistors (i.e., transistors with a nominal voltage between 10 and 200 V) if the gates of the normally-on transistors Q3, Q4, Q7 and Q8 feature highly blocking gate oxides. For example, full-wave rectifiers in power supply applications have blocking capabilities of about 800 V to avoid severe damage—caused by peak voltages that may occur e.g., in a 230 V/50 Hz power grid by passing voltage peaks and corresponding current peaks to an intermediate stage capacitor for attenuation. In order to achieve the necessary blocking capabilities, transistors Q1, Q3, Q5 and Q7 may feature asymmetric blocking capabilities. For example, transistors Q1 and Q5 may have a nominal blocking voltage between 30 and 200 V, while transistors Q3 and Q7 can each withstand differential voltages of about 800 V. A higher reverse voltage of the normally-on transistors can be achieved, for example, by means of transistors with blocking voltages of 700-800 V or by series connection of a multiplicity of normally-on transistors with lower blocking voltage capabilities.

Figure 2:
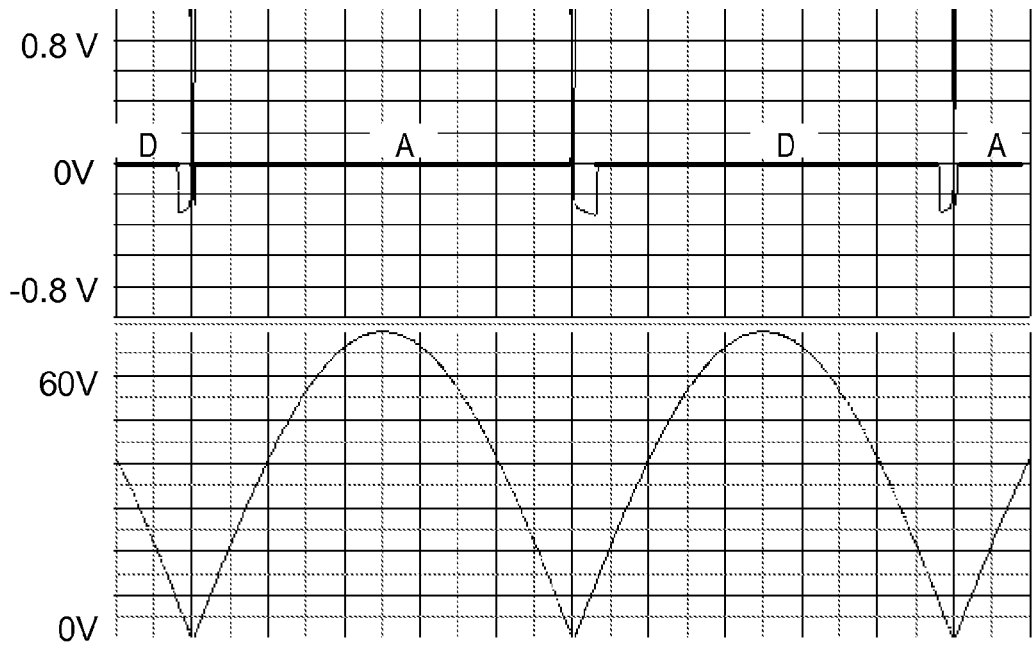
FIG. 2 is a diagram illustrating simulation results of the full-wave rectifier shown in FIG. 1.

FIG. 2 is a diagram depicting simulation results of the rectifier shown in FIG. 1 operated with an alternating input voltage of about 70 V. The top part of FIG. 2 shows in detail the voltage over time at rectifying paths A, C or B, D linked to the same input path AC1 or AC2, whereby the blocking voltage is clipped off in the representation of FIG. 2 for the sake of improved presentability. The bottom part of FIG. 2 shows the full-wave rectified voltage over time at load L. It should be noted that at the signal crossing of the input voltage, the body diodes of transistors Q6 (paths C and D) or Q2 (paths A and B) are initially active before the input voltage is high enough to switch transistors Q2 and Q6 into an ohmic conductive state with low voltage drop. Because of the current flow through the respective body diode, slightly increased power loss may temporarily occur. Through selection of the starting voltage of the normally-off transistors, the losses can be minimized. However, in most power supply applications, a power factor correction which enables a current to flow on the AC input lines is used. This current is also sinusoidal and in phase with a sinusoidal AC line voltage so that during and close to the zero crossing of the AC line voltage the line current flowing through the full wave rectifier is also low. This helps to minimize the losses even when the current flows through the body diodes for a short period of time. No such minimization has been applied in the rectifier that forms the basis for the diagrams shown in FIG. 2.

Figure 3:
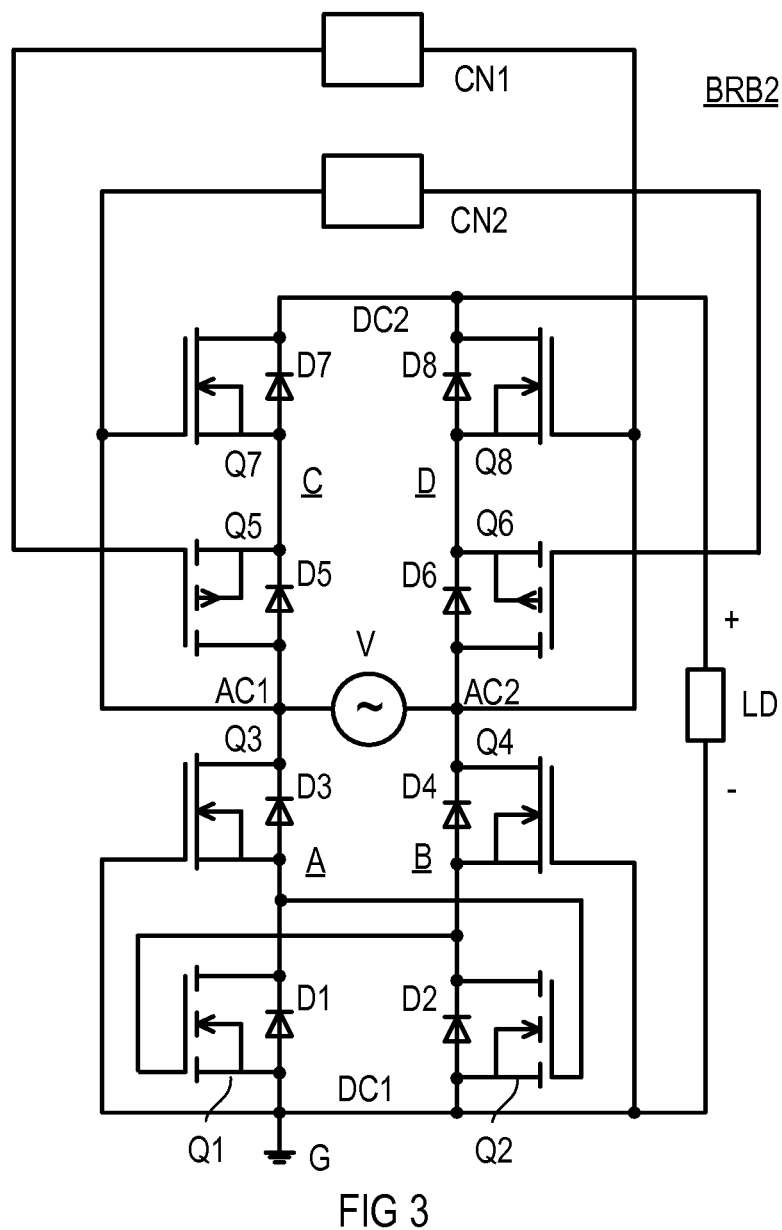
FIG. 3 is a circuit diagram of an alternative full-wave rectifier based on the full-wave rectifier shown in FIG. 1.
Figure 4:
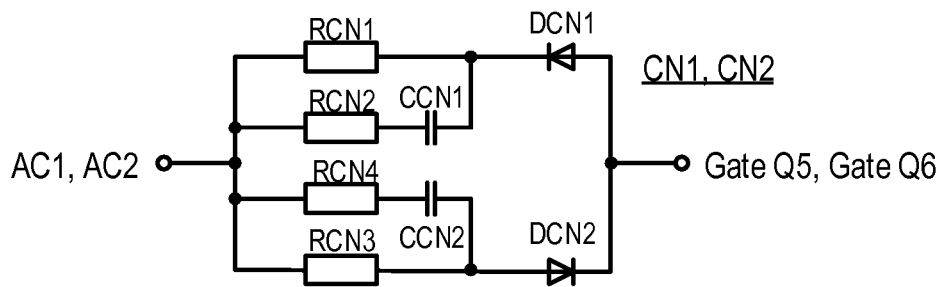
FIG. 4 is a circuit diagram of an alternative full-wave rectifier with two transistors in each rectifying path.

FIG. 3 depicts an alternative rectifier circuit BRB2 based on the rectifier circuit BRB1 shown in FIG. 1. In contrast to the rectifier circuit BRB1, the gate lines of transistors Q5 and Q6 in the rectifier circuit BRB2 are not connected to the drain lines of transistors Q1 and Q2 but are coupled via coupling networks CN1 and CN2 to input path AC2 and input path AC1, respectively. The coupling networks CN1 and CN2 are configured to process the signals supplied to the gate lines so that the switching operations of transistors Q5 and Q6 are performed after a certain delay time. The delay times for switching-on and switching-off may be different. For example, the delay time for switching off may be shorter than the delay time for switching on.

The coupling networks CN1 and CN2 may be identical and comprise a resistor RCN1 which is connected in series with a diode DCN1 for switching-on the respective normally-off p-channel field effect transistor Q6, Q5. An optional series connection of a resistor RCN2 and a capacitor CCN1 may form a frequency dependent bypass for resistor RCN1 in order to accelerate the turn-on of the respective normally-off p-channel field effect transistors Q6, Q5. The series connection of resistor RCN2 and capacitor CCN1 may be used to reduce turn-on delay of normally-off p-channel transistor Q5 without reducing the resistance of resistor RCN1 and thus without causing higher control losses especially at higher voltages between the input paths AC1 and AC2. The coupling networks CN1 and CN2 may further comprise a resistor RCN3 which is connected in series with a diode DCN2 for turning-off the respective normally-off p-channel field effect transistors Q6, Q5. An optional series connection of a resistor RCN4 and a capacitor CCN2 may form a frequency dependent bypass for resistor RCN3 in order to accelerate turn-off of the respective normally-off p-channel field effect transistors Q5, Q6. The gate lines of the normally-off p-channel field effect transistors Q5, Q6 may be protected against overvoltage e.g., by way of anti-serial connected Zener or avalanche diodes coupled with the respective source lines of the normally-off p-channel field effect transistors Q5, Q6 (not shown in the Figures).

When alternating voltage source V provides a voltage with a positive polarity on input line AC1 and a negative polarity on input line AC2, the potential at the source of transistor Q5 (i.e., in output path DC2) is theoretically more negative than that in input path AC1 by approximately the sum of the forward voltages of body diodes D5 and D7. As transistor Q5 is a normally-off transistor, the actual difference of the potentials may be approximately the same value as the forward voltage of body diode D5.

The voltage occurring between input path AC2 and input path AC1 is in this case negative and is applied to the gate-source path of the normally-off p-channel transistor Q5 via coupling network CN1. Since the source line of transistor Q5 is only slightly negative compared to the drain of transistor Q5 because the conducting body diode D5, coupling network CN1 is able to discharge the gate of transistor Q5 to an even more negative value via diode DCN1 and resistor RCN1. Thus transistor Q5 will be rendered into conducting state and body diode D5 is bridged by the conducting drain-source-path of transistor Q5. Since gate source voltage of normally-on transistor Q7 is supplied by the drain-source voltage of transistor Q5, transistor Q7 will also be in conducting state and body diode D7 will be bridged by transistor Q7.

In this operating condition, the coupling network CN2 applies the positive voltage of input path AC1 to the gate line of normally-off p channel transistor Q6 via diode DCN2 and resistor RCN3 resulting in a gate source voltage of transistor Q6. The gate line of transistor Q6 is more positive than the (negative) threshold voltage of transistor Q6 so that transistor Q6 is in blocking state. The optional bypass with the series connection of resistor RCN4 and capacitor CCN2 may be used to reduce the turn-off delay of transistor Q6 without the necessity of reducing the resistance of resistor RCN3 and thus without causing higher control losses, e.g., at higher voltages between the input terminals AC1 and AC2.

The voltage between input paths AC1 and AC2 is approximately the same as the voltage between the drain line of normally-on n-channel transistor Q8 and the drain line of normally-off p channel transistor Q6. In this operating state, both transistor Q6 and transistor Q8 block and thus divide the voltage between the first input path AC1 and the first output path DC1 at the node between their drain lines. A current flowing through load LD via the second output path DC2 and input path AC1 may cause a voltage drop between output path DC2 and input path AC1 which is defined by the parallel connection of the body diodes D5 and D7 with the channels of transistors Q5 and Q7, which exhibit ohmic behavior.

Figure 5:
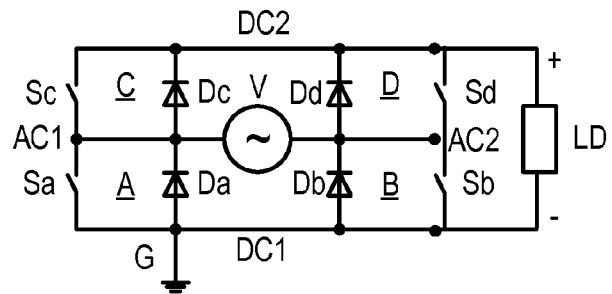
FIG. 5 is a simplified equivalent circuit diagram of the full-wave rectifier shown in FIG. 1.

FIG. 5 is a simplified equivalent circuit diagram of the full-wave rectifiers shown in FIGS. 1 and 3. Alternating voltage source V is connected via a diode bridge with diodes Da, Db, Dc and Dd to load L. Diodes Da, Db, Dc and Dd may be representative of the body diodes D1-D8 of transistors Q1-Q8. Each of the diodes Da, Db, Dc and Dd comprises a bypass switch Sa, Sb, Sc or Sd, whereby switches Sa, Sb, Sc and Sd are formed by the corresponding cascode circuits with transistors Q1-Q8. In other words, each of the diodes Da, Db, Dc and Dd may be a single diode or a series connection of at least two diodes or body diodes. Also, the switches Sa, Sb, Sc and Sd may be realized each as a single switch or a series connection of at least two switches. Accordingly, each rectifying path A, B, C and D includes a parallel connection of a switch Sa, Sb, Sc or Sd and a diode Da, Db, Dc or Dd. For example, switches Sa, Sb, Sc and Sd and thus the corresponding rectifying paths A, B, C and D may connect input path AC1 to output path DC1 and input path AC2 to output path DC2 during one half wave of the input voltage, and they may connect input path AC1 to output path DC2 and input path AC2 to output path DC1 during the other half wave of the input voltage.

Figure 6:
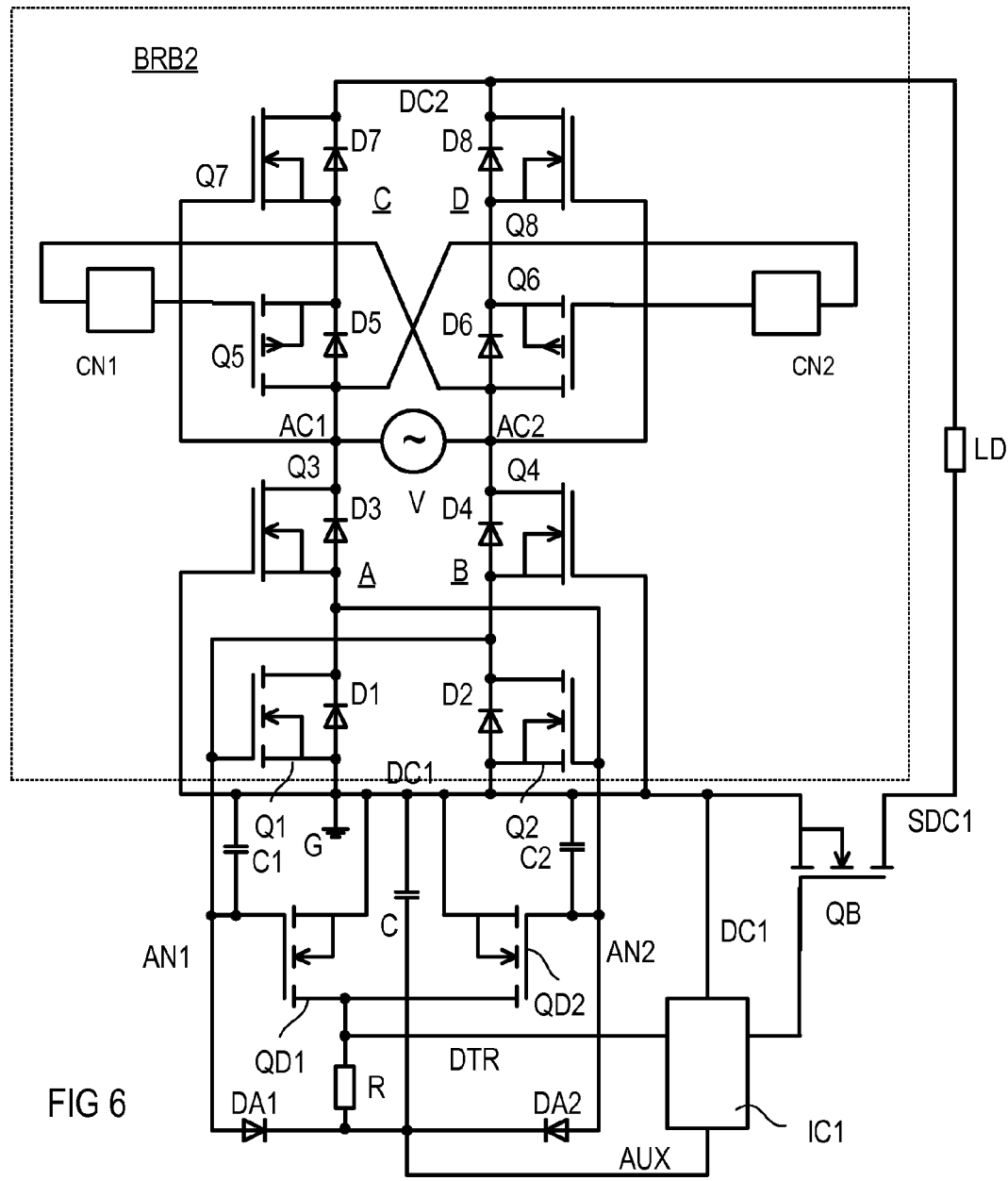
FIG. 6 is a circuit diagram of a full-wave rectifier as shown in FIG. 1 with an additional auxiliary voltage circuit and a voltage detector.

FIG. 6 depicts an exemplary bridge rectifier with an additional auxiliary output path AUX based on the bridge rectifier BRB2 shown in FIG. 3. The auxiliary output path AUX is supplied with an auxiliary output voltage by an auxiliary voltage circuit which includes in the present example two diodes DA1 and DA2 as rectifier elements. Diode DA1 is connected between the auxiliary output path AUX and an auxiliary output node AN1 which is connected to the drain line of transistor Q2 and the gate line of transistor Q1. Diode DA2 is connected between the auxiliary output path AUX and an auxiliary output node AN2 which is connected to the drain line of transistor Q1 and the gate line of transistor Q2. As long as the voltage at the auxiliary output path AUX is lower than the voltage at auxiliary output node AN1 or auxiliary output node AN2, the corresponding diode DA1, DA2 is in forward operation and may conduct a current as long as the corresponding normally-on transistor Q3, Q4 is in a conducting mode.

Optional capacitors C1 and C2 may be connected between auxiliary output nodes AN1, AN2 and ground G to allow for an additional charge stored in these capacitors for reducing unintended feedback on the gate of the respective transistor Q1 or Q2. When the difference between the input AC voltage from alternating voltage source V is only rising a little above the auxiliary voltage appearing on the auxiliary output path AUX, the capacitor C is charged via the diode DA1 or DA2 until the normally-on transistor Q3 or Q4 respectively has a gate-source voltage negative enough to block, thus ending the charging of the capacitor C. The capacitor C is charged only during a time when voltages appear at the input path AC1, AC2 which are only slightly higher than the actual voltage at the capacitor C. This enables to provide a rather low-ohmic connection between the corresponding node of the input path AC1, AC2 via the normally-on transistor Q3, Q4, enabling fast charging of capacitor C without high losses. The auxiliary circuit may be used not only at standby operation but also during normal operation, as the small voltage loss renders generally needed additional circuitry, such as transformers or high-voltage capacitors, unnecessary.

The auxiliary voltage is supplied to a switch control circuit IC1, even when the bridge rectifier block BRB as a whole is not active. The switch control circuit IC1 may detect at least one of the events that may include at least one of the following; the auxiliary output voltage exceeds a first threshold, the auxiliary output voltage drops below a second threshold, the auxiliary output voltage crosses zero voltage in one direction and the auxiliary output voltage crosses zero voltage in the other direction. Since the auxiliary output voltage at the node AUX is smoothed by the capacitor C, alternatively other signals may be used to detect these thresholds. In the exemplary rectifier shown in FIG. 6, voltage detection transistors QD1 and QD2 are shown with the drain lines of detection transistors QD1 and QD2 connected to a pull-up resistor R and to detector path DTR connected to an input node of the switch control circuit IC1. The other pin of the pull-up resistor R may be connected to the auxiliary output voltage AUX. The source lines of the voltage detection transistors QD1 and QD2 may be connected to ground G. The gate lines of the voltage detection transistors QD1 and QD2 are connected to the output nodes AN1 and AN2 respectively. When either the output node AN1 or AN2 is exceeding the threshold voltage of the voltage detection transistor QD1 or QD2, the corresponding voltage detection transistor QD1 or QD2 is rendered conductive and is pulling the voltage at the detector path DTR at or close to ground G. The voltage at the detector path DTR is detecting immediately when the input voltages AC1 and AC2 rises over ground G or the threshold voltage of the voltage detection transistors QD1 or QD2, respectively. The threshold level for zero crossing detection can further be shifted to a desired level, e.g., by way of Zener diodes and additional resistors. The capacitors C1 and C2 may be used to smooth the voltage connected to the gate lines of the voltage detection transistors QD1 and QD2 to prevent small spikes on the input voltage AC1 and AC2 to trigger a change in the voltage of the detector path DTR. When one of the voltage detection transistors QD1 or QD2 is omitted, the detection of e.g., zero crossing is still feasible but limited either to the input line AC1 or AC2. The detection transistors alternatively may be integrated in the switch control circuit IC1. In a different example (not shown in FIG. 6), each drain line of the voltage detection transistors QD1 and QD2 is connected via a resistor to the auxiliary output voltage AUX resulting in two detector paths and input nodes of the switch control circuit IC1.

The switch control circuit IC1 controls an output path switch to be in an on-state if at least one of the events is detected and to control the output path switch to otherwise be in an off-state. The output path switch may be a normally-off transistor QB whose source line is connected to output path DC1 and whose drain line is connected to a switched output path SDC1. The transistor QB is operated as a circuit breaker that separates the switched output path SDC1 and, thus load LD, from the output path DC1 when, for example, the auxiliary voltage on the auxiliary output path drops or is below a certain threshold voltage. The threshold voltage may represent a minimum supply voltage for additional circuitry supplied by the DC output voltage and/or the auxiliary output voltage. Alternatively or additionally, zero crossing in one or both directions may be detected to control transistor QB accordingly. For example, transistor QB may be switched on and/or off only at or close to zero-crossings in order to generate no switching artifacts.

In one example, the control transistor QB may be switched on just when the first zero crossing of the input voltage at the input lines AC1, AC2 is detected and then remains on during the whole operating time of the Load LD. In another example, the number of zero crossings of the input voltage at the input lines AC1, AC2 is counted and then at a certain zero crossing the control transistor QB is switched on and remains on during the whole operating time of the Load LD.

In one alternative to the two aforementioned examples, an electric current flowing through the control transistor QB in on-state is measured and when a certain current value is exceeded the transistor QB is turned off until the next zero crossing of the input voltage at the input lines AC1, AC2 is detected and then the transistor QB is turned-on again. This method may be beneficial when the load comprises a capacitor between the second output node DC2 and the switched output path SDC1 which is normally uncharged during the first turn-on. So the method may be used to pre-charge a capacitive load with limited, controlled charge packages at a certain number of zero crossings of the input voltage at the input lines AC1, AC2 until the capacitive load is fully charged and the control transistor QB remains on during the operation time of the load.

Figure 7:
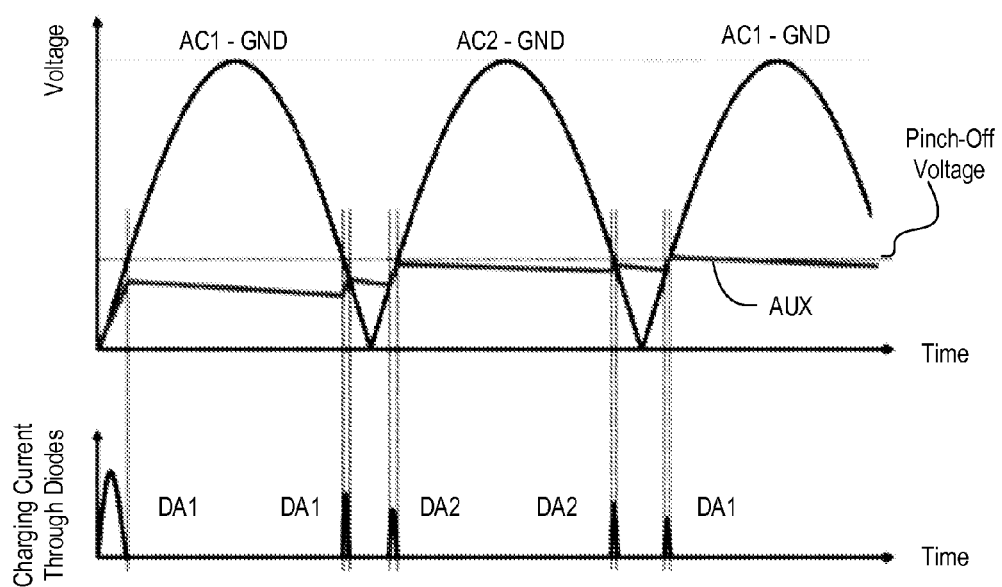
FIG. 7 is a voltage timing diagram illustrating the characteristics of the auxiliary voltage AUX relative to the input voltage.

FIG. 7 shows the voltages at the input paths AC1 and AC2 related to ground G over time. As in many AC grids these input voltages may show a sinusoidal characteristic. Assuming capacitor C being not charged in the beginning (voltage AUX=0V) in this example, a rising voltage at the input path AC1 brings a current to flow through diode DA1 until the voltage at the auxiliary output node AN1 reaches the pinch-off voltage between source and gate of the normally-on transistor Q3 and thus renders normally-on transistor Q3 into blocking state so that the current stops flowing through diode DA1. When the voltage at the input path AC1 drops below the pinch-off voltage of the normally-on transistor Q3, transistor Q3 again enters a conducting state and again a current flows through diode DA1 until the voltage at input path AC1 falls below the voltage at the auxiliary output path AUX and the diode DA1 is rendered into blocking mode. Subsequently, the voltage at input path AC2 rises. When the voltage at input path AC2 reaches the voltage of the auxiliary output path AUX the diode DA2 is in a conducting state and a current flows until the voltage at input path AC2 reaches the pinch-off voltage of the normally-on transistor Q4. The circuit providing the auxiliary voltage can also be configured to provide a negative auxiliary voltage AUX.

In the example shown in FIG. 7, it takes two half waves of the input voltage at the input paths AC1, AC2 to charge capacitor C up to the pinch-off voltage of the corresponding normally-on transistors Q3, Q4. But this is only an example and depending on the value of the capacitor C, a current flowing from the capacitor C into connected loads and the on-state resistance of the corresponding normally-on transistors Q3, Q4 which may vary during time depending on the actual gate-source voltage of the normally-on transistors Q3, Q4 which may have a negative polarity. As a consequence, the voltage at the output path AUX may reach the pinch-off voltage of the normally-on transistors Q3, Q5 already during the first half wave of the input voltage, or may take more time (e.g., during the second, the third, or one of the following half waves of the input voltage). As one possibility, the voltage at the output path AUX may only temporarily or never the pinch-off voltage of the normally-on transistors Q3, Q5.

In the circuit providing the auxiliary voltage, the capacitor C is only charged when the voltages at the input paths AC1, AC2 are in the same range as the voltage at the auxiliary output path AUX and thus no significant losses occur during supplying a charge to the capacitor C. When the input voltages AC1, AC2 are substantially higher than the voltage at the auxiliary output path, AUX current flow is blocked by transistors Q3, Q4.

In order to smooth the auxiliary output voltage, a capacitor C may be connected between the auxiliary output path AUX and ground G to which also output path DC1 is connected. The voltage at capacitor C may be limited e.g., by using Zener or avalanche diodes parallel to the capacitor. Alternatively or additionally, an additional switch may be situated between one pin of capacitor C and the cathodes of diodes DA1 and DA2 which is only conducting as long as a maximum voltage at capacitor C is not exceeded. In the present example, diodes DA1 and DA2 are connected with their cathodes to the auxiliary output path AUX, however, with other circuit structures the anodes cathodes may be connected to the auxiliary output path as well.

The auxiliary voltage may be supplied to a circuit IC that may be a control circuit, stand-by circuit, start-up circuit, zero crossing detector or any other circuitry that needs to be supplied with power when the bridge rectifier block BRB2 as a whole is not active. The auxiliary voltage is only connected to the voltages at input paths AC1, AC2 when there is only little voltage difference so a low ohmic connection may be realized in contrast to conventional stand-by or start-up supplies where a current flowing from the input voltages to the auxiliary voltage needs to be limited by rather high ohmic resistors in the range of more than 10 kΩ or even more than 100 kΩ so that the current is limited to a few mA up to e.g., 10 mA in power applications. It takes a relatively long time for the capacitor C to become sufficiently charged by the auxiliary voltage. In contrast, by charging the capacitor C only at times during which the input voltage is only a little higher than the auxiliary voltage, the connection may be realized low-ohmic leading to charging currents in the range more than 10 mA, some 10 mA, 100 mA or even more, and thus reducing the time delay at start-up to approximately 1/10 of conventional approaches in power applications. In contrast to conventional start-up or stand-by supplies, charging capacitor C at input voltages that are only a little bit higher than the voltage at the auxiliary output AUX causes no significant losses so that the voltage at the auxiliary path may not only be used for start-up and stand-by supplies but also for regular operation of auxiliary loads such as control circuits and the like In this case, additional circuitry usually needed to supply auxiliary loads (e.g., control circuits) such as transformers or high-voltage capacitors are not required.

Optional capacitors C1 and C2 may be connected between auxiliary output nodes AN1, AN2 and ground G to allow for an additional charge stored in these capacitors to be discharged to the auxiliary output path AUX when the drain source voltage of the respective transistor Q1 or Q2 increases. When the difference between the input AC voltage from alternating voltage source V and the auxiliary voltage appearing on the auxiliary output path AUX is small, the charge of the (low-voltage) capacitors C1 and C2 may establish a voltage of about the auxiliary voltage so that voltage losses are negligible. In other words, the capacitors C1 and C2 may reduce the feedback on the gates of Q1 or Q2 a current flow via the diodes DA1 or DA2 to the capacitor C may have. Capacitors C1 and C2 may have only smaller capacitances since they are mainly intended to suppress noise, transients and interferences and would otherwise decrease the efficiency of the circuit.

The circuit IC may require information about the current input AC voltage from alternating voltage source V, e.g., if the input AC voltage exceeds a first threshold or drops below a second threshold. In order to provide such information, two voltage detection transistors, which are in the present case normally-off n-channel field-effect transistors QD1 and QD2, are connected between the auxiliary output nodes AN1, AN2 and a control path CTR connected to a corresponding input of the circuit IC. For example, a pull-up resistor R is connected between the control path CTR and the auxiliary output path AUX. The control path CTR is further coupled with the drain lines of transistors QD1 and QD2 whose source lines are connected to ground G (i.e., output path DC1). The gate line of transistor QD1 is connected to the auxiliary output node AN1 and the gate line of transistor QD2 is connected to the auxiliary output node AN2.

When the voltage at the gate line of transistor Q1 exceeds the turn-on voltage of transistor QD1, transistor QD1 is turned on into a conductive state. Then the voltage at a node connecting the drain lines of transistors QD1, QD2 and resistor R drops to the level of output path DC1 (ground G). The voltage level (potential) at the control path CTR drops to almost 0V so that a voltage increase following a voltage zero crossing can be detected. The threshold level for zero crossing detection can be shifted to a desired level, e.g., by way of Zener diodes, avalanche diodes and/or additional resistors.

Instead of the example shown in FIG. 6, different approaches may be used for zero crossing detection with the detection transistors QD1, QD2. For example, both of the transistors QD1, QD2 may be supplied with a separate pull-up resistor R and the separate drain signals of the transistors QD1, QD2 may be fed separately via two control paths CTR into the circuit IC delivering not only information about the zero crossing but also about which of the input paths AC1, AC2 has a positive voltage. In an alternative example, the pull-up resistor R or the pull-up resistors in case of separate drain nodes may be omitted resulting in so-called open-drain transistors which may be used for zero crossing detection via a pull-down of a voltage at the control path CTR to ground G.

The circuit providing the auxiliary voltage may be further configured and adapted to provide further functions such as providing a multiplicity of auxiliary paths with different voltages (higher, lower, positive, negative) with little power loss and to allow for zero-voltage crossing detection.

Figure 8:
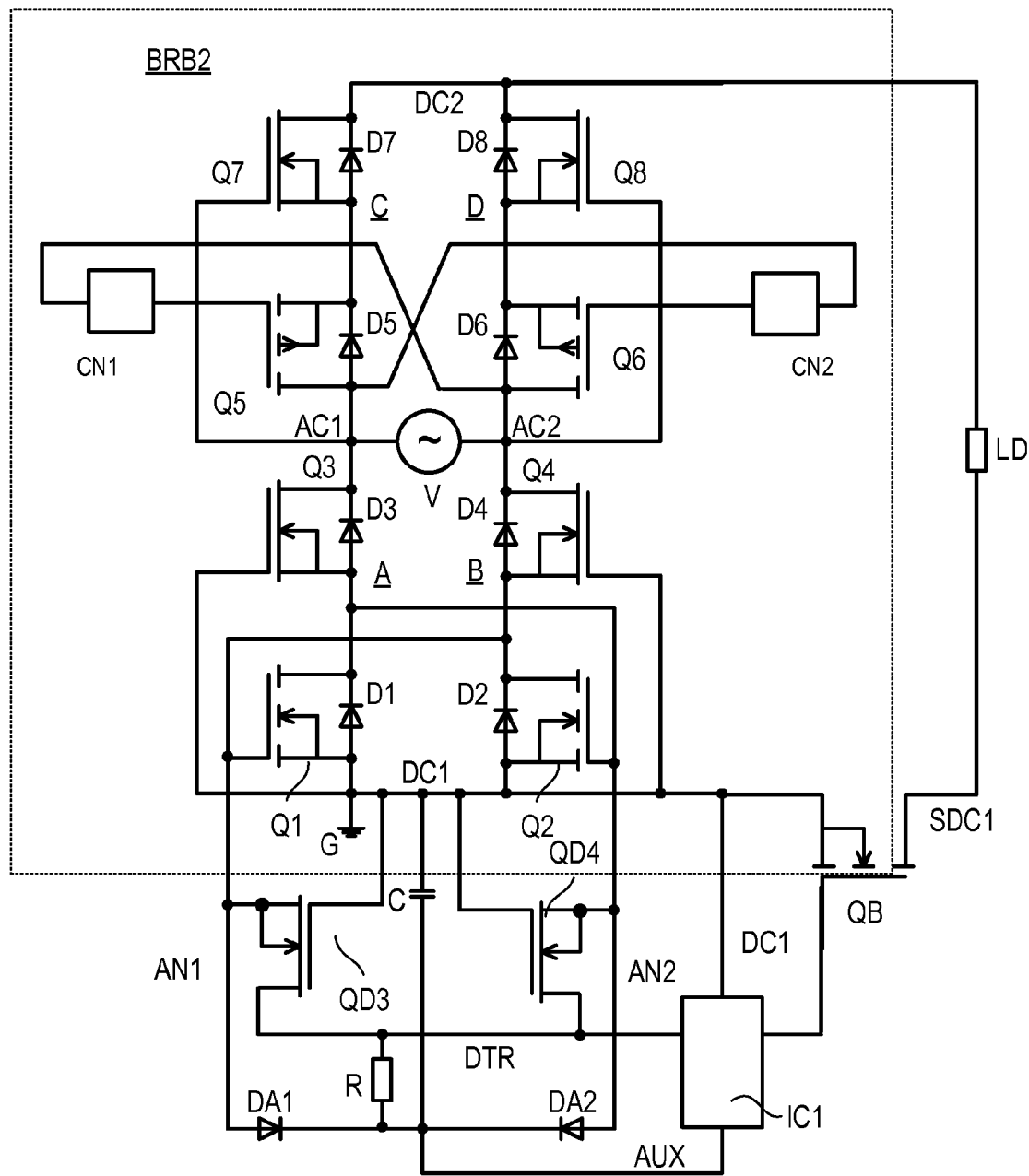
FIG. 8 is a circuit diagram of a full-wave rectifier as shown in FIG. 1 with an additional auxiliary voltage circuit and an alternative voltage detector.

As shown in FIG. 8, normally-on n-channel field-effect transistors QD3 and QD4 may be alternatively used as voltage detection transistors instead of the normally-off n-channel field-effect transistors QD1 and QD2 employed in the rectifier shown in FIG. 3. The detector path DTR is coupled with the drain lines of transistors QD3 and QD4 whose gate lines are connected to ground G (i.e., output path DC1). The source line of transistor QD3 is connected to the auxiliary output node AN1 and the source line of transistor QD2 is connected to the auxiliary output node AN2. If it is sufficient to detect only each second zero crossing (i.e., one crossing direction) only one of transistors QD1-QD4 may be employed.

Figure 9:
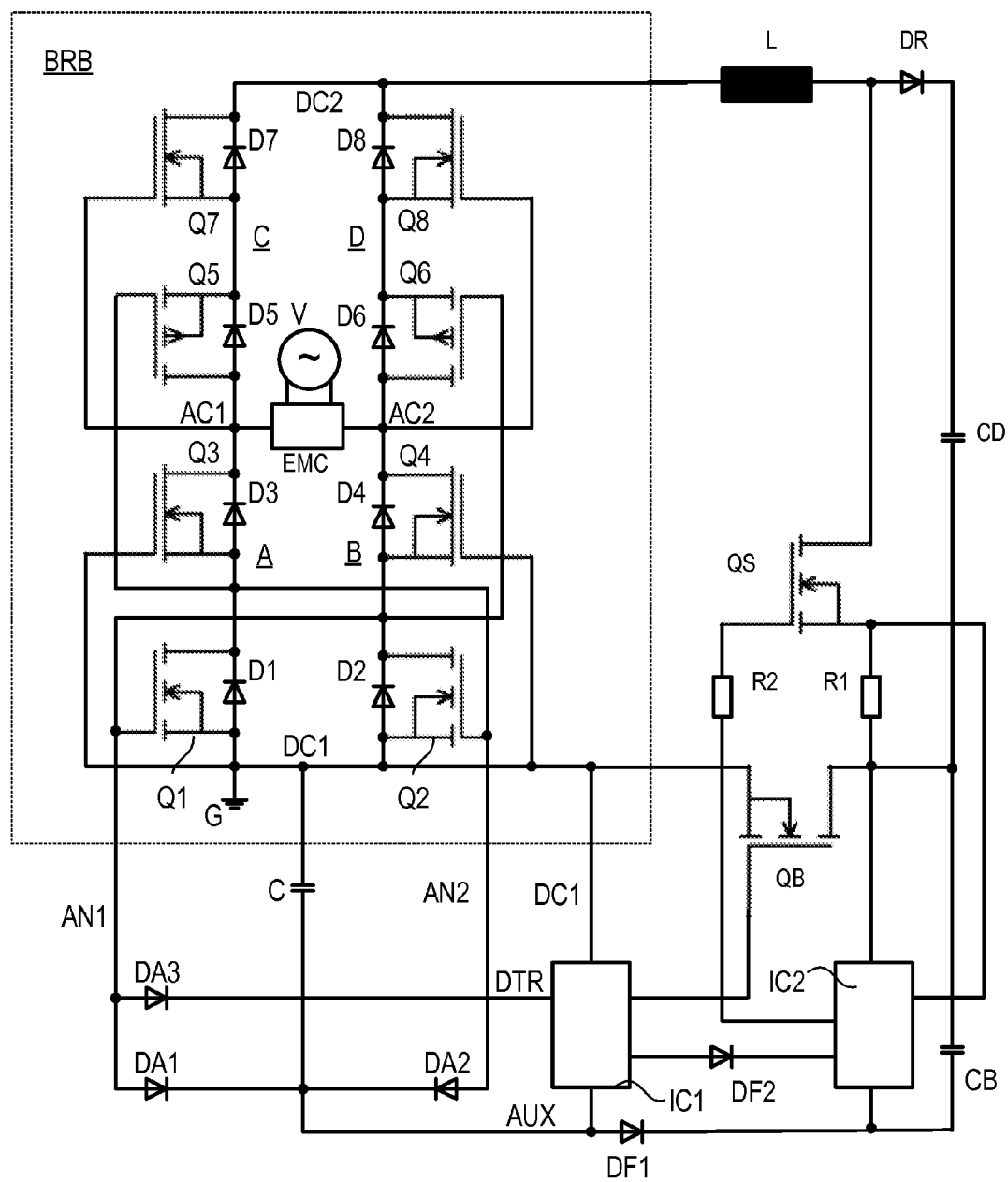
FIG. 9 is a circuit diagram of a full-wave rectifier as shown in FIG. 1 with an additional auxiliary voltage circuit providing two auxiliary voltages.

Alternatively, other types of transistors in connection with an accordingly adapted circuit structure may be used as detection transistors. Furthermore, a multiplicity of series or parallel connected transistors may be used as detection transistors, i.e., instead of transistors QD1-QD4. Instead of transistors, diodes DA3 and DA4 may be used for voltage detection as shown in FIG. 9. The diodes DA3 and DA4 may be connected between the detector path DTR and the auxiliary output nodes AN1, AN2. If it is sufficient to detect only each second zero crossing only one of transistors QD1-QD4 may be employed. The bridge rectifier circuit BRB1 may be used instead of rectifier circuit BRB2 as shown in FIG. 9. In the rectifying paths C and D alternatively or additionally, further parallel or series connected diodes (not shown) may be used. Furthermore, in some or all switching paths more than two transistors per path may be used as described below in connection with FIG. 10.

In the rectifier shown in FIG. 9, which is based on the arrangement shown in FIG. 8, only one detector diode, diode DA3, which is connected between the detector path DTR and the auxiliary output node AN1, is used as it may be sufficient to detect only each second zero crossing (i.e., one crossing direction). Additionally, the rectifier shown in FIG. 9 includes circuitry for processing the rectified input AC voltage, i.e., the output voltage provided by output paths DC1 and DC2. Such circuitry may be (switched-mode) power controllers such as a (switched-mode) power factor controller (PFC) with a PFC control circuit IC2. The PFC control circuit IC2 is supplied with the auxiliary voltage on auxiliary path AUX via a diode DF1 and controlled or enabled by the switch control circuit IC1 via a diode DF2. The supply voltage for PFC control circuit IC2 may be buffered by a capacitor CB that is connected between a supply voltage input of PFC control circuit IC2 and switched output path SDC1. The power factor controller may further include a series connection of an inductance L, a diode DR and capacitor CD, wherein the series connection is connected between the output path DC1 and the switched output path SDC1, wherein the voltage at capacitor CD may be supplied to other circuitry (not shown) as supply voltage. A node between inductance L and diode DR is connected via the controllable path of a normally-off transistor QS and an optional resistor R1, which may serve as a shunt resistor for current measurement, to switched output path SDC1. The control path of transistor QS is connected to and controlled by PFC control circuit IC2 via an optional resistor R2.

The proof voltage of transistor QB should be sufficiently higher than the maximum voltage that can be present on the output paths DC1 and DC2. The proof voltage may be for example 800V or even more than 800 V. When AC power is switched on, the PFC control circuit IC2 and the switch control circuit IC1 are not active and, thus, transistor QB is switched off, i.e., is in a nonconductive state. Due to the non-conducting state of transistor QB, capacitor CD is not charged. Therefore, no current peaks can occur at the capacitor CD and in the bridge rectifier.

Not before capacitor C is sufficiently charged so that switch control circuit IC1 is operable, zero crossing detection may provide information about points in time at which the AC input voltage has a small value, i.e., zero or a small range around zero, and at which transistor QB can be switched on or switched off without generating significant artifacts. As already outlined above, in some applications it may be sufficient to detect only every second zero crossing (i.e., only one crossing direction) so that the circuitry required for zero crossing detection can be reduced. The zero crossing detection input of switch control circuit IC1 may be pulled down to output path DC1 with a resistor (not shown) if applicable in order to reduce input noise sensitivity of switch control circuit IC1. Alternative to detecting zero crossings the alternating (input) voltage may be evaluated in view of a certain voltage level. The level may be adjusted by way of resistors, zener diodes and other voltage limiting elements.

For example, a voltage change from zero to a given level may be detected (e.g., it is detected if the input voltage is small or greater than the given level). If two diodes such as the diodes DA3 and DA4 are employed as in the arrangement shown in FIG. 8 each half wave zero crossing can be detected or one diode triggers the other. For example, falling edge at diode DA3 may activate diode DA4.

In an exemplary mode of operation, transistor QB may switch on at a particular zero crossing of the AC input voltage so that capacitor CD is charged until the peak value of the AC input voltage is reached. In the present example, switching on transistor QB may be performed after a certain number of zero crossings have occurred, i.e., after a certain delay time. With the delay noise and artifacts generated by, e.g., mains connector when plugged in or an oscillating switching element. The delayed time can further be used to count the number of zero crossings, and if the count deviates from an expected number, an error signal may be generated.

Between the input nodes of the bridge rectifier AC1, AC2 and the supplying voltage source V, i.e., the grid, a filter unit is needed in many switched mode power supplies to comply with the regulations of electromagnetic compatibility (EMC). EMC filters in general comprise inductors and capacitors, the latter following the voltage V of the supplying grid. When, for example, a cable connecting the switched mode power supply to a socket and hence to the supplying grid is pulled during operation, the capacitors in the EMC filter remain charged at the voltage of the grid at the instant of disconnection. Touching the connectors of the plug may be dangerous, which is why it is needed to regularly detect the voltage level at the input of the bridge rectifier and, in case no further zero crossings occur for a time, actively discharge the capacitors in the EMC filter to an uncritical level. This can be easily done by turning on both the transistor QS and the transistor QB. The diode DR is then in blocking mode, preventing the capacitor CD from being discharged.

If the current in the output paths DC1 and DC2 is too high, and an inductance such as inductance L is present in one of the output paths DC1 and DC2, transistor QB can be clocked in a manner similar to clocking transistor QS in order to limit the peak of current. The circuitry connected to the output paths DC1 and DC2 may include further circuit elements which are shown for the sake of simplicity. Supplying the switch control circuit IC1 and the PFC control circuit IC2 is only done when the difference between the AC input voltage and the auxiliary voltage is small, there is only little power loss, which makes the rectifier circuit very efficient.

In the rectifying paths C and D alternatively or additionally, further parallel or series connected diodes (not shown) may be used. Furthermore, in some or all switching paths more than two transistors per path may be used as described below in connection with FIG. 10.

Figure 10:
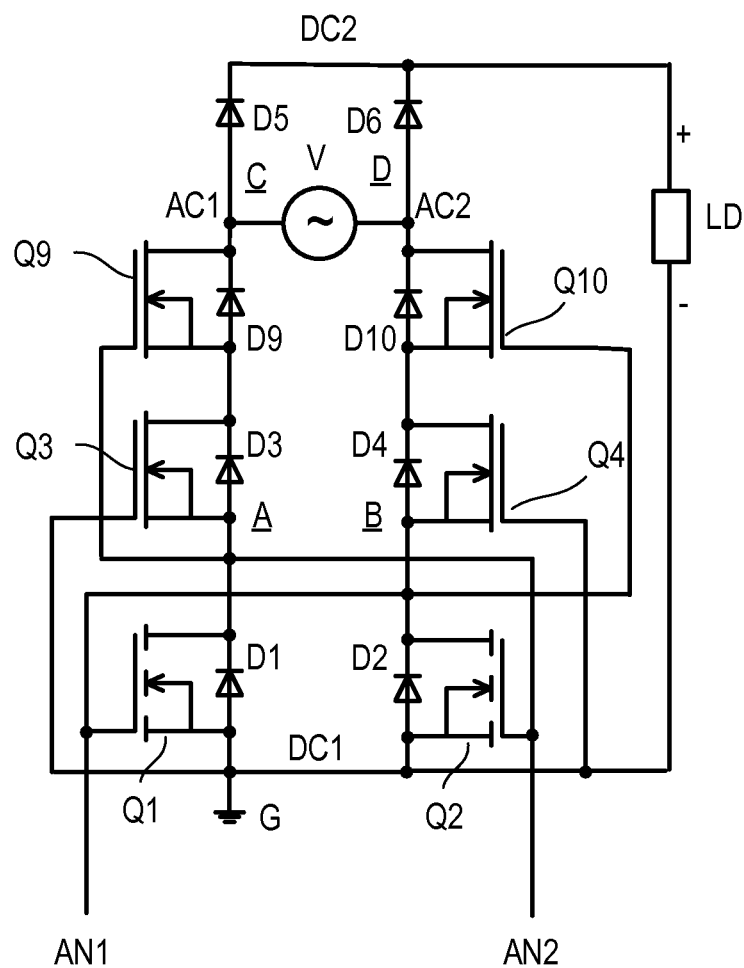
FIG. 10 is circuit diagram of a full-wave rectifier with three transistors in each rectifying path as an alternative to the full-wave rectifier shown in FIG. 1.

Referring to FIG. 10, which shows an alternative bridge rectifying circuit BRB3, the full-wave rectifier BRB1 shown in FIG. 1 may be enhanced by adding another normally-on field-effect transistor Q9 and Q10 to each of the switching rectifying paths (switched-mode rectifying paths) to increase the blocking capabilities in each of the rectifying paths A and B. In particular, the source-drain path of transistor Q9 is connected between the drain line of transistor Q3 and input path AC1. The gate line of transistor Q9 is connected to the source line of transistor Q3. The source-drain path of transistor Q10 is connected between the drain line of transistor Q4 and input path AC2. The gate line of transistor Q10 is connected to the source line of transistor Q4. In each rectifying path C and D shown in FIG. 10 a diode D5, D6 is connected between input paths AC1, AC2 and DC2, thus establishing a bypass of a pn-junction threshold only in rectifying paths A and B so that switching elements may be omitted in the rectifying paths C and D.

As an alternative (not shown), instead of single diodes D5, D6 a series connections of two or more diodes may be used to increase the blocking capabilities in each of the rectifying paths C and D over a single diode at the expense of higher conduction losses.

It is noted that all bridge rectifiers BRB1, BRB2 and BRB3 are interchangeable in the examples described above, depending on the application. Furthermore, the paths A, B can be combined with any paths C; D described herein and with many other conventional rectifying paths.

In the examples shown in FIGS. 6, 8 and 9, zero voltage detection and/or auxiliary supply to capacitor C is designed symmetrically from both auxiliary nodes AN1 and AN2. As an alternative, at least one of zero voltage detection and/or auxiliary supply to capacitor C may be realized only via one of the auxiliary nodes AN1 and AN2, e.g., capacitor C is connected to auxiliary node AN1 via rectifying element DA1 and control path CTR is connected to auxiliary node AN2 via rectifying element DA4 or switching element QD2 or QD4.

The full-wave rectifiers described above may be applicable in connection with ohmic loads or subsequent buck and/or boost converters such as power factor controllers. For example, in a power factor controller, the intermediate stage capacitor is uncoupled from the input (full-wave) rectifier and an inductor by a buck/boost diode so that there is no reverse current flowing from the intermediate stage capacitor to the input (e.g., the power grid), which would otherwise be the case when applying a capacitive load directly.

The full-wave rectifiers described above have a bridge-like structure with cascode circuits whose load paths form the rectifying paths. Cascode circuits sharing the same input path and/or cascode circuits sharing ground (corresponding to one of the output paths) may be cross-coupled with each other via the cascode circuit inputs and intermediate outputs of the cascode circuits. The cascode circuits may employ transistors of only a single conductivity type or of both types, e.g., only p-channel transistors, only n-channel transistors or both. The transistors in the cascodes may be of the normally-on type or the normally-off type, depending on their function within the cascode circuit. For example, the normally-on transistors may be used to increase the proof voltage, and the (cross-coupled) normally-off transistors may be used to control switching off the rectifier. The number of transistors per rectifying path in the above examples is 2 or 3 but may be likewise any number higher than 3.

While various embodiments of the invention have been described, it will be apparent to those of ordinary skill in the art that many more embodiments and implementations are possible within the scope of the invention.

The invention claimed is:

1. A rectifier comprising:
   two input paths configured to receive an alternating input voltage;
   two output paths configured to provide a direct output voltage;
   a switched-mode rectifying path that is connected between one of the input paths and one of the output paths and that comprises at least two semiconductor elements with controllable paths, the controllable paths being series-connected with each other;
   an auxiliary output node that is disposed between the controllable paths of the two semiconductor elements in the rectifying path and that provides an auxiliary node voltage;
   a controllable output path that is connected downstream of one of the two output paths and that comprises a semiconductor element with a controllable path, wherein the controllable path of the semiconductor element of the controllable output path is controlled by a signal representing the auxiliary node voltage,
   at least one additional rectifying path that is connected between one of the input paths and one of the output paths, wherein at least one of the additional rectifying path is a switched-mode rectifying path that comprises at least two semiconductor elements with controllable paths, the controllable paths being series-connected with each other, wherein the one switched-mode rectifying path and at least one additional switched-mode rectifying path are connected to the one same output path, and are configured to connect one output path to one input path during one half wave of the input voltage and to connect the one output path to the other input path during the other half wave of the input voltage; and an additional auxiliary output node that is disposed between the controllable paths of two semiconductor elements in the additional rectifying path and that provides an additional auxiliary node voltage, wherein the controllable path of the semiconductor element of the controllable output path is further controlled by a signal representing the additional auxiliary node voltage.

2. The rectifier of claim 1, wherein the semiconductor elements are transistors.

3. The rectifier of claim 1, further comprising a voltage detector that is
connected to at least one of the two auxiliary output nodes,
configured to detect if the auxiliary voltage exceeds or undercuts a threshold voltage, and
configured to provide a detector output signal on a detector output path to indicate if the auxiliary voltage exceeds or undercuts a threshold voltage.

4. The rectifier of claim 3, wherein the voltage detector comprises at least one of:
a first detector transistor having a controllable path and a controlling path, the controllable path being connected between one of the two output paths and the detector output path, and the controlling path being connected to one of the two auxiliary output nodes; and
a second detector transistor having a controllable path and a controlling path, the controllable path being connected between the one output path and the detector output path, and the controlling path being connected to the other of the two auxiliary output nodes.

5. The rectifier of claim 3, wherein the voltage detector comprises at least one of:
a third detector transistor having a controllable path and a controlling path, the controllable path being connected between one of the two auxiliary output nodes and the detector output path, and the controlling path being connected to one of the two output paths; and
a fourth detector transistor having a controllable path and a controlling path, the controllable path being connected between the other of the two auxiliary output nodes and the detector output path, and the controlling path being connected to the one output path.

6. The rectifier of claim 3, further comprising circuitry that is controlled dependent on a signal status of the detector output signal.

7. The rectifier of claim 1, further comprising a capacitor that is connected between the auxiliary path and one of the two input paths.

8. The rectifier of claim 1, further comprising at least one rectifier element that is connected between an additional auxiliary output and one of the two auxiliary output nodes.

9. The rectifier of claim 1, wherein the switched-mode rectifying paths each comprise a cascode circuit with a normally-off transistor and a normally-on transistor, the normally-off transistor and the normally-on transistor being of the same conductivity type.

10. The rectifier of claim 9, wherein in the switched-mode rectifying paths,
the normally-off transistors and the normally-on transistors are field-effect transistors with gate, source and drain lines;
the cascode circuits each comprise a series connection of a common-source stage and a common-gate stage;
the normally-off transistors are configured to be the common-source stages of the cascode circuits; and
the normally-on transistors are configured to be the common-gate stages of the cascode circuits.

11. The rectifier of claim 10, wherein in the switched-mode rectifying paths,
the source lines of the normally-off transistors in the switched-mode rectifying paths are connected to the same output path; and
the gate lines of the normally-off transistors in the switched-mode rectifying paths are coupled with the drain lines of the normally-off transistor in the respective other rectifying path.

12. The rectifier of claim 1, further comprising two other additional rectifying paths that are connected between each of the input paths and each of the output paths; wherein the switch-mode rectifying path and the three additional rectifying paths are configured to connect one input path to one output path and the other input path to the other output path during one half wave of the input voltage, and configured to connect the first input path to the second output path and the second input path to the first output path during the other half wave of the input voltage; and the two other additional rectifying paths are connected to the same other output path.

13. The rectifier of claim 12, wherein the two other additional rectifying paths each comprise at least one diode.

14. The rectifier of claim 12, wherein the two other additional rectifying paths are switched mode rectifying paths.

15. The rectifier of claim 14, wherein the two other additional rectifying paths each comprise a cascode circuit with a normally-off transistor and a normally-on transistor, the normally-off transistor and the normally-on transistor being of different conductivity types.

16. The rectifier of claim 15, wherein the gate line of the normally-off transistor in one of the two other additional rectifying paths are coupled via a coupling network with the drain line of the normally-off transistor in respective other additional rectifying path and vice versa.

17. The rectifier of claim 16, wherein the coupling networks comprise a resistor-capacitor network.

18. The rectifier of claim 16, wherein the coupling networks are configured to provide a signal delay time.

19. The rectifier of claim 18, wherein the coupling networks are configured to provide different signal delay times for rising and falling edges of a signal.

20. The rectifier of claim 1, further comprising a switch control circuit that is configured to detect at least one of the following events: that the auxiliary output voltage exceeds a first threshold, the auxiliary output voltage undercuts a second threshold, the auxiliary output voltage crosses zero voltage in one direction and the auxiliary output voltage crosses zero voltage in the other direction; wherein
the switch control circuit is configured to control the controllable path of the semiconductor element of the controllable output path to be in an on-state if at least one of the events is detected and to control the output path switch to otherwise be in an off-state.

21. The rectifier of claim 20, wherein the auxiliary output path is further configured to provide an auxiliary direct current output voltage which is supplied to the switch control circuit.

22. The rectifier of claim 20, further comprising additional circuitry that is connected to the switch control circuit and supplied by the auxiliary direct current output voltage, the additional circuitry being configured to process at least one of direct current output voltage and auxiliary node voltage, and configured to be activated or deactivated by the switch control circuit.

23. A rectifier comprising:
first and second input paths configured to receive an alternating input voltage;
first and second output paths configured to provide an output voltage from the alternating input voltage;
four rectifying paths that are connected between the input paths and the output paths, the rectifying paths being configured to connect the first input path to the second output path and the second input path to the second output path during one half wave of the input voltage, and to connect the first input path to the second output path and the second input path to the first output path during the other half wave of the input voltage, wherein at least two rectifying paths are switched-mode rectifying paths that comprise at least two semiconductor elements with controllable paths, the controllable paths being series-connected with each other;
two auxiliary output nodes that are disposed between the controllable paths of two semiconductor elements in the switched-mode rectifying paths and that provide auxiliary node voltages corresponding to the alternating input voltage, the auxiliary node voltages being referenced to the first output path or the second output path;
a controllable output path that is connected downstream of one of the two output paths and that comprises a semiconductor element with a controllable path; and
a switch control circuit supplied with the auxiliary node voltage and connected to the semiconductor element in the controllable output path, wherein the switch control circuit is configured to detect at least one event and to control the controllable path of the semiconductor element in the controlled output path dependent on the detected event.

24. The rectifier of claim 23, further comprising at least one rectifier element that is connected between an additional auxiliary output and one of the two auxiliary output nodes.

25. The rectifier of claim 23, wherein the switch control circuit is connected to the auxiliary output nodes via at least one of:
a first detector transistor having a controllable path and a controlling path, the controllable path being connected between one of the two output paths and the detector output path, and the controlling path being connected to one of the two auxiliary output nodes; and
a second detector transistor having a controllable path and a controlling path, the controllable path being connected between the one output path and the detector output path, and the controlling path being connected to the other of the two auxiliary output nodes.

26. The rectifier of claim 23, wherein the switch control circuit is connected to the auxiliary output nodes via at least one of:
a third detector transistor having a controllable path and a controlling path, the controllable path being connected between one of the two auxiliary output nodes and the detector output path, and the controlling path being connected to one of the two output paths; and
a fourth detector transistor having a controllable path and a controlling path, the controllable path being connected between the other of the two auxiliary output nodes and the detector output path, and the controlling path being connected to the one output path.

27. The full-wave rectifier of claim 23, further comprising a switched-power controller connected to the switch control circuit and configured to be activated or deactivated by the switch control circuit.

28. A rectifier comprising:
two input paths configured to receive an alternating input voltage;
two output paths configured to provide a direct output voltage;
a switched-mode rectifying path that is connected between one of the input paths and one of the output paths and that comprises at least two semiconductor elements with controllable paths, the controllable paths being series-connected with each other;
an auxiliary output node that is disposed between the controllable paths of the two semiconductor elements in the rectifying path and that provides an auxiliary node voltage;
a controllable output path that is connected downstream of one of the two output paths and that comprises a semiconductor element with a controllable path, wherein the controllable path of the semiconductor element of the controllable output path is controlled by a signal representing the auxiliary node voltage
a voltage detector that is connected to at least one of the two auxiliary output nodes, configured to detect if the auxiliary voltage exceeds or undercuts a threshold voltage, and configured to provide a detector output signal on a detector output path to indicate if the auxiliary voltage exceeds or undercuts a threshold voltage,
wherein the voltage detector comprises at least one of:
a first detector transistor having a controllable path and a controlling path, the controllable path being connected between one of the two output paths and the detector output path, and the controlling path being connected to one of the two auxiliary output nodes; and
a second detector transistor having a controllable path and a controlling path, the controllable path being connected between the one output path and the detector output path, and the controlling path being connected to the other of the two auxiliary output nodes.

* * * * *

UNITED STATES PATENT AND TRADEMARK OFFICE
CERTIFICATE OF CORRECTION

PATENT NO. : 9,621,069 B2  
APPLICATION NO. : 14/456346  
DATED : April 11, 2017  
INVENTOR(S) : A. Mauder et al.

Page 1 of 1

It is certified that error appears in the above-identified patent and that said Letters Patent is hereby corrected as shown below:

In the Claims

Column 15, Line 1 please change "path is" to -- paths is --

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*